United States Patent [19]

Stokes

[11] Patent Number: 5,534,339
[45] Date of Patent: Jul. 9, 1996

[54] POLYOLEFIN-POLYAMIDE CONJUGATE FIBER WEB

[75] Inventor: Ty J. Stokes, Suwanee, Ga.

[73] Assignee: Kimberly-Clark Corporation, Neenah, Wis.

[21] Appl. No.: 379,373

[22] Filed: Jan. 27, 1995

Related U.S. Application Data

[63] Continuation-in-part of Ser. No. 201,582, Feb. 25, 1994, Pat. No. 5,424,115.

[51] Int. Cl.⁶ ............................................. B32B 27/00
[52] U.S. Cl. .................... 428/284; 428/224; 428/286; 428/288; 428/296; 428/297; 428/298; 428/373; 428/374; 428/398; 428/903
[58] Field of Search ................................. 428/224, 288, 428/296, 284, 373, 374, 903, 284, 398, 297, 298, 286

[56] References Cited

U.S. PATENT DOCUMENTS

| | | | |
|---|---|---|---|
| 3,117,906 | 1/1964 | Tanner | 161/177 |
| 3,200,440 | 8/1965 | Bryan et al. | 18/8 |
| 3,297,807 | 1/1967 | Settele | 264/171 |
| 3,536,802 | 10/1970 | Uraya et al. | 264/171 |
| 3,725,192 | 4/1973 | Ando et al. | 161/175 |
| 3,780,149 | 12/1973 | Keuchel et al. | 264/168 |
| 3,787,162 | 1/1974 | Cheetham | 425/463 |
| 3,788,940 | 1/1974 | Ogata et al. | 428/373 |
| 3,855,045 | 12/1974 | Brock | 161/146 |
| 3,895,151 | 7/1975 | Matthews et al. | 428/102 |
| 3,924,045 | 12/1975 | Ogasawara et al. | 428/373 |
| 3,940,302 | 2/1976 | Matthews et al. | 156/167 |
| 4,005,169 | 1/1977 | Cumbers | 264/103 |
| 4,035,219 | 7/1977 | Cumbers | 156/290 |
| 4,041,203 | 8/1977 | Brock et al. | 428/157 |
| 4,211,816 | 7/1980 | Booker et al. | 428/296 |
| 4,306,929 | 12/1981 | Menikheim et al. | 156/290 |
| 4,396,366 | 8/1983 | Kessler et al. | 425/131.5 |
| 4,424,257 | 1/1984 | Bach | 428/370 |
| 4,424,258 | 1/1984 | Bach | 428/370 |
| 4,547,420 | 10/1985 | Krueger et al. | 428/229 |
| 4,555,430 | 11/1985 | Mays | 428/134 |
| 4,588,630 | 5/1986 | Shimalla | 428/131 |
| 4,596,742 | 6/1986 | Selivansky et al. | 428/373 |
| 4,601,949 | 7/1986 | Bach et al. | 428/374 |
| 4,729,371 | 3/1988 | Krueger et al. | 128/206.19 |
| 4,761,322 | 8/1988 | Raley | 428/198 |
| 4,774,124 | 9/1988 | Shimalla | 428/171 |

(List continued on next page.)

FOREIGN PATENT DOCUMENTS

| | | |
|---|---|---|
| 0088744 | 9/1983 | European Pat. Off. . |
| 965729 | 8/1964 | United Kingdom . |

OTHER PUBLICATIONS

J. Lunenschloss & W. Albrecht (Ed.)/Ellis Horwood Ltd: "Nonwoven Bonded Fabrics": pp. 311–314 (1985).
R. J. Rogers: "Methods, Materials and Products of Thermal Bonding" in Principles of Nonwovens: pp. 633–650.
A. Drelich: "Thermal Bonding with Fusible Fibers" in Nonwovens Industry, Sep. 1985, pp. 12–26.
L. M. Landoll & B. J. Hostetter: "Dependence of Thermal Bonded Coverstock Properties on Polypropylene Fiber Characteristics" in Polypropylene Fibers and Textiles IV, Sep. 1987, pp. 41/1–41/8.
P. Olivieri, M. Branchesi & T. Ricupero: "Thermal Bonding—The Fastest-Growing Application for Polypropylene Staple: Success and Development" in Polypropylene Fibers and Textiles IV, Sep. 1987, pp. 40/1–40/10.

Primary Examiner—James J. Bell
Attorney, Agent, or Firm—Michael U. Lee

[57] ABSTRACT

The present invention provides a conjugate fiber containing a polyolefin and a polyamide selected from polycaprolactam, copolymers of caprolactam and hexamethylene adipamide, hydrophilic copolymers of caprolactam and ethylene oxide diamine, and blends thereof, wherein the polyamide has a number average molecular weight up to about 16,500. Further provided are a nonwoven fabric produced from the conjugate fiber and the process of producing the nonwoven fabric.

22 Claims, 3 Drawing Sheets

U.S. PATENT DOCUMENTS

| | | | |
|---|---|---|---|
| 4,795,668 | 1/1989 | Krueger et al. | 428/174 |
| 4,806,299 | 2/1989 | Burns | 264/171 |
| 4,830,904 | 5/1989 | Gessner et al. | 428/219 |
| 4,981,749 | 12/1991 | Kubo et al. | 428/219 |
| 5,071,705 | 12/1991 | Tanaka et al. | 428/370 |
| 5,143,786 | 9/1992 | Tanaka et al. | 428/357 |
| 5,167,764 | 12/1992 | Nielsen et al. | 162/146 |
| 5,207,970 | 5/1993 | Joseph et al. | 264/518 |
| 5,232,770 | 8/1993 | Joseph | 428/284 |
| 5,238,733 | 8/1993 | Joseph et al. | 428/284 |
| 5,290,626 | 3/1994 | Nishio et al. | 428/903 |
| 5,364,694 | 11/1994 | Okada et al. | 428/903 |
| 5,382,400 | 1/1995 | Pike et al. | 264/168 |

POLYOLEFIN-POLYAMIDE CONJUGATE FIBER WEB

CROSS-REFERENCE TO RELATED APPLICATION

This application is a continuation-in-part of application Ser. No. 08/201,582, filed Feb. 25, 1994 now U.S. Pat. No. 5,424,115.

BACKGROUND OF THE INVENTION

The present invention is related to conjugate fibers of two different thermoplastic polymers and nonwoven webs produced therefrom. More specifically, the invention is related to conjugate fibers and nonwoven webs of a polyolefin and a polyamide.

Conjugate fibers contain at least two component compositions that occupy distinct cross sections along substantially the entire length of the fibers, and they are produced by simultaneously and contiguously extruding a plurality of molten fiber-forming polymeric compositions to spinning orifices of a spinneret to form unitary filament strands. In general, component compositions for conjugate fibers are selected from different polymers having different shrinkage properties and/or complementarily advantageous chemical and physical properties. Component polymers having different shrinkage properties are typically utilized to impart crimpability in the conjugate fibers, and component polymers having different advantageous properties are utilized to impart different functionalities in the fibers.

Since different polymers have different melting and processing temperatures as well as have different rheological melt properties, it is usually necessary or desirable to process and maintain component polymer compositions for conjugate fibers at different temperatures until just prior to combining the melted polymer compositions as unitary filament strands. In many cases, when different melted polymers are combined to form unitary strands, there emerge numerous processing difficulties such as nonuniformity of the strands, spin breaks and bending phenomena of unsolidified strands at the tip of the spinneret. Such processing difficulties prevent proper formation of fibers and, thus, nonwoven fabrics. In addition, especially for fiber-spinning processes that employ pneumatic drawing steps, e.g., meltblown fibers and spunbond fibers, the filament strands exiting the spinneret tend to bundle or rope during the drawing process unless the processing conditions are carefully tailored for each polymer combination. Such controlled processing conditions ensure, for example, proper quenching of the component polymers forming the filament strands and separation of the extruded strands until they are deposited onto the forming surface. There have been many approaches to solve these processing difficulties in spinning conjugate fibers of different polymer compositions. For example, British Pat. No. 965,729 discloses a spinneret containing angularly placed orifices that is inclined in the opposite direction to the bending direction of the extruded conjugate fiber strands. However, the teaching of the patent may only be practical for large production runs since a specific spinneret has to be constructed for each combination of different polymers. U.S. Pat. No. 3,536,802 to Uraya et al. discloses a method of separately extruding and maintaining component polymer compositions at different temperatures until just prior to combining and extruding into unitary fiber strands in order to alleviate the processing difficulties by keeping the melt viscosities of the component polymer compositions substantially at the same level. The teaching of Uraya et al. utilizes the fact that linear thermoplastic polymers in general decrease their melt viscosity as the melt temperature increases. However, the process of ensuring the thermal profile of each component polymer melts requires a cumbersome or complex spinneret assembly that contains insulation layers. In addition, the temperature difference of the polymer components of the unitary filament strands creates processing difficulties in handling the extruded filaments. For example, component polymers having different melt temperatures tend to solidify at different rates, and insufficiently quenched polymer components of the conjugate filaments tend to cause random fusing or roping of the filament strands before the filaments can be properly deposited on a forming surface.

Of various conjugate fibers having different polymers, conjugate fibers of a polyolefin and polyamide combination are highly useful. U.S. Pat. No. 3,788,940 to Ogata et al., for example, discloses conjugate fibers containing a polyolefin and a long-carbon chain polyamide, e.g., nylon-11, nylon-12, nylon-11/10, nylon-11/11 or nylon-11/12. Long-carbon chain polyamides have melting and processing temperatures that are lower than more commonly available and conventional nylons, i.e., nylon 6 and nylon 6/6. The melting and processing temperatures of these long-carbon chain polyamides are practically comparable to those of polyolefins such that these polyamides and polyolefins can easily be processed to form conjugate fibers. In contrast, more conventional and economical polyamides, i.e., nylon 6 and nylon 6/6, have significantly higher melting points and, thus, have to be melt-processed at a higher processing temperature range than typical polyolefins. Moreover, as is known in the art, a thermoplastic polymer is typically melt-processed at a temperature significantly higher than the melting point of the polymer in order to accommodate the typical temperature fluctuation of the melt-processing equipment, e.g., an extruder, and, thus, to avoid accidental solidification or freeze up of the polymers in the melt-processing equipment and to provide a composition melt that has a properly processible melt viscosity. In general, when a composition melt is underheated, the melt has an elongational viscosity or a melt elasticity that is too high to allow proper drawing of the extruded filaments; and when a melt is overheated, the extruded filaments from the melt cannot be quenched properly and sufficiently. Consequently, overheated and underheated melts do not properly form useful filaments, e.g., cause spin breaks and form fused and/or roped fibers. Accordingly, conventional polyamides and polyolefins have been melt-processed at different processing temperatures and, therefore, typically required specialized processing equipment to produce conjugate fibers.

There remains a need for providing polymer compositions for polyolefin/polyamide conjugate fibers that can be processed with conventional polyolefin processing equipment and that contain polymer components which need not be processed at different processing temperatures.

SUMMARY OF THE INVENTION

There is provided in accordance with the present invention a conjugate fiber containing a polyolefin and a polyamide selected from polycaprolactam, copolymers of caprolactam and hexamethylene adipamide, hydrophilic copolymers of caprolactam and ethylene oxide diamine, and blends thereof, wherein the polyamide has a number average molecular weight up to about 16,500. Further provided is a nonwoven fabric produced from the conjugate fiber.

The present invention further provides a desired method of producing conjugate fibers and nonwoven fabrics that contain a fiber-forming polyolefin and a polyamide selected from polycaprolactam, copolymers of caprolactam and hexamethylene adipamide, hydrophilic copolymers of caprolactam and ethylene oxide diamine, and blends thereof, wherein the polyamide has a number average molecular weight up to about 16,500. The method contains the steps of melt-extruding the polyolefin, melt-extruding the polyamide, feeding the extruded polyolefin and polyamide to an orifice of a spinneret to form a unitary filament, wherein the melted polyolefin and polyamide entering the orifice are melt-processed to have melt temperatures between the melting point of the polyamide and about 240° C.

DETAILED DESCRIPTION OF THE INVENTION

Figure 3:
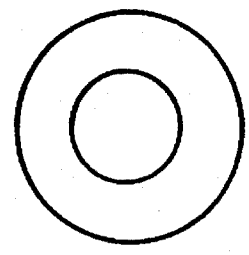
FIGS. 1–6 illustrate exemplary conjugate fiber cross-sectional configurations.

The present invention discloses conjugate fibers having a polyolefin and a polyamide, and nonwoven webs produced from the conjugate fibers. The conjugate fibers and the nonwoven webs exhibit improved strength properties, e.g., tensile strength and tear strength; abrasion resistance; bonding characteristics, e.g., broader bonding temperature range; and functionalities, e.g., dyeability and hydrophilicity, over polyolefin fibers and nonwoven webs therefrom. In addition, the nonwoven web contains functional chemical groups, i.e., amide groups, that can be chemically modified to introduce various surface functionalities on the nonwoven web. The component polymer compositions of the present conjugate fibers, unlike conventional short-carbon chain polyamide compositions of prior art conjugate fibers, can be processed at a temperature that is typically used to melt-process polyolefins and can be processed with a conventional non-insulated conjugate fiber spinning apparatus.

Polyamides, otherwise known as "nylons," suitable for the present invention include polycaprolactam (nylon 6), copolymers of caprolactam and hexamethylene adipamide (nylon 6,6/6), and hydrophilic copolymers of caprolactam and ethylene oxide diamine, as well as blends thereof. Of these, the most desirable polyamide for the present invention is polycaprolactam. In accordance with the present invention, suitable polyamides are low molecular weight polyamides that have a number average molecular weight equal to or less than about 16,500; desirably between about 10,000 and about 16,200; more desirably between about 11,000 and about 16,000; most desirably between about 11,500 and about 15,000. It is believed that suitable polyamides having a low number average molecular weight of 5,000 or even less can be melt-extruded into the conjugate fibers of the present invention. Particularly suitable polyamides for the present invention have a formic acid relative viscosity between about 1.8 and about 2.15, more particularly between about 1.85 and about 2, as measured in accordance with ASTM D789-66, and have a melt flow rate between about 48 g/10 min and about 100 g/10 min, more particularly between about 65 g/10 min and 95 g/10 min, as measured in accordance with ASTM D1238-90b, Condition 230/2.16. Optionally, the polyamide composition for the conjugate fibers may contain a small amount of a processing lubricant to improve the processibility of the polyamides. For example, a small amount of a metal or mineral stearate, e.g., calcium, sodium, lead, barium, cadmium, zinc or magnesium stearate, can be blended into the polyamide composition to increase its melt flow rate and reduce its melt viscosity. Desirably, up to about 5%, more desirably between about 0.01% and about 4%, based on the weight of the polymer, of a stearate compound is blended into the polymer composition.

It has been found that the polyamides suitable for the present invention can be melt processed at the conventional processing temperature range for polyolefins without experiencing processing difficulties, such as bending and roping of extruded conjugate filament strands. Desirably, the polyamide is melt-processed to have a melt temperature between the melting point of the polyamide and about 240° C., more desirably between about 215° C. and about 238° C., most desirably between 225° C. and about 235° C., especially when spunbond conjugate fibers are produced. The term "melt temperature" as used herein indicates the temperature of polymer composition melt that enters the spinning pack. It is to be noted that the processing temperature suitable for the present invention is significantly lower than the conventional processing temperature range for polycaprolactam and is not significantly higher than the melting point of the polyamide. Although it is not wished to be bound by any theory, it is believed that the unique low molecular weight of the suitable polyamides for the present invention provides the required melt viscosity even at the present low melt-processing temperature range. In contrast, commercially available fiber grade polycaprolactams have to be melt-processed at a higher temperature range than the processing temperature range of typical polyolefins in order to obtain proper melt flow characteristics that are compatible with melt-processed polyolefins. Consequently, the conjugate fiber component compositions containing the present polyamide can be processed with a conventional spinneret assembly that is maintained at the conventional operating temperature range typically utilized for polyolefins.

Polyolefins suitable for the present inventions include polyethylene, e.g., high density polyethylene, medium density polyethylene, low density polyethylene and linear low density polyethylene; polypropylene, e.g., isotactic polypropylene and atactic polypropylene; polybutylene, e.g., poly(1-butene) and poly(2-butene); polypentene, e.g., poly(2-pentene), and poly(4-methyl-1-pentene); polyvinyl acetate; polyvinyl chloride; polystyrene; and copolymers thereof, e.g., ethylene-propylene copolymer; as well as blends thereof. Of these, more desirable polyolefins are polypropylene, polyethylene, polybutylene, polypentene, polyvinyl acetate, and copolymers and blends thereof. Most desirable polyolefins for the present invention are polyolefins conventionally used in the production of nonwoven fabrics, including polypropylene, polyethylene, copolymers of polypropylene and polyethylene, and blends thereof; more particularly, isotactic polypropylene, blends of isotactic polypropylene and atactic polypropylene, syndiotactic polypropylene, high density polyethylene, linear low density polyethylene and blends thereof. In addition, the polyolefin component may further contain minor amounts of compatibilizing agents, abrasion resistance enhancing agents, crimp inducing agents and the like. Illustrative examples of such agents include acrylic polymer, e.g., ethylene alkyl acrylate copolymers; polyvinyl acetate; ethylene vinyl acetate; polyvinyl alcohol; ethylenevinyl alcohol and the like.

The component polymer compositions of the present invention may additionally contain other additives and processing aids. For example, nucleating agents, colorants, pigments, wetting agents, surfactants, antistats, odor absorbents, germicides, lubricants and the like. These additives can be, for example, dry or tumble blended with the polymeric pellets of the component polymers before the pellets are melt-processed.

Processes suitable for producing conjugate fibers are known in the art. In general, at least two flowably processed component polymer compositions are fed through spinning orifices of a spinneret to form unitary filaments having distinct cross sections along substantially the entire length of the filaments that are occupied by the polymer compositions. Conjugate fibers can be prepared to have crimps or latent crimpability. While it is not wished to be bound by any theory, it is believed that conjugate fibers containing component polymers of different shrinkage properties possess subsequently activatable "latent crimpability". When such conjugate fibers are exposed to a heat treatment or mechanical drawing process, the shrinkage disparity among the component polymers of the conjugate fibers causes the fibers to crimp. An exemplary process for producing highly suitable conjugate fibers for the present invention is disclosed in commonly assigned U.S. Pat. No. 5,382,400 to Pike et al., which in its entirety is herein incorporated by reference. Briefly, the process for making a crimped conjugate fiber web, more specifically a spunbond fiber web, disclosed in the patent includes the steps of meltspinning continuous multicomponent polymeric filaments, at least partially quenching the multicomponent filaments so that the filaments have latent crimpability, activating the latent crimpability and drawing the filaments by applying heated drawing air, and then depositing the crimped, drawn filaments onto a forming surface to form a nonwoven web. In general, a higher drawing air temperature results in a higher number of crimps. Optionally, unheated ambient air can be used during the drawing step to suppress activation of the latent crimpability and to produce uncrimped conjugate fibers. Multicomponent conjugate meltblown fiber and methods of making the same are disclosed in, for example, U.S. Pat. Nos. 5,238,733; 5,232,770; 4,547,420; 4,729,371 and 4,795,668.

Figure 6:
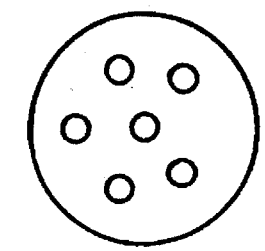
Figure 2:
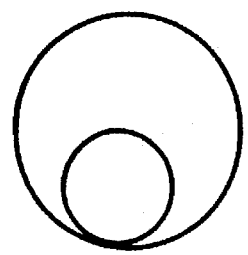
Figure 5:
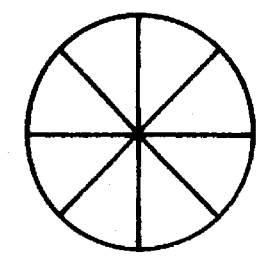
Figure 1:
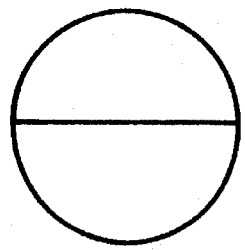
Figure 4:
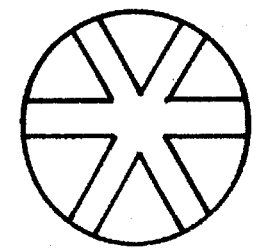

The conjugate fibers of the present invention may have a wide variety of conjugate fiber configurations. FIGS. 1–6 illustrate examples of suitable conjugate fiber configurations. Suitable conjugate fiber configurations include a side-by-side configuration (FIG. 1), an eccentric sheath-core configuration (FIG. 2), a concentric sheath-core configuration (FIG. 3), a wedge-core configuration (FIG. 4), a wedge configuration (FIG. 5) and a islands-in-sea configuration (FIG. 6). The conjugate fibers may also be hollow fibers. The unique molecular weight polycaprolactams of the present invention can be melt-extruded at polyolefin processing temperatures and, thus, have a quenching profile similar to the polyolefin component of the conjugate fibers. In addition, melted compositions of the low molecular weight polyamides exhibit a reduced melt elasticity or elongational viscosity, improving the compatibility of the polyamide and polyolefin components of the conjugate fibers and drawability of the extruded filaments. It is also believed that the melt of the unique molecular weight polycaprolactams exhibits improved and reduced visco-elastic properties even when the melt is cooled to a temperature near or below the melting point, i.e., even after the melt starts to solidify, further facilitating drawability of the extruded conjugate filaments. The present polyamide component can be conveniently processed under the processing settings adapted for polyolefins, thereby eliminating processing difficulties and problems associated with producing conjugate fibers from component polymers of different processing temperatures and melt viscosities.

Nonwoven webs or fabrics are produced from the conjugate fibers by depositing the fibers onto a forming surface. Typically, the fibers are randomly and isotropically deposited to form a nonwoven web having uniform fiber coverage. If the conjugate fibers are not self-adhering at the time of nonwoven web formation, the nonwoven web has to be bonded to impart physical integrity and strength. For example, typical meltblown fibers are not completely quenched or solidified when they are deposited onto a forming surface, and therefore, the fibers form autogenous interfiber bonds as they are deposited to form a meltblown fiber web. In contrast, spunbond fibers and staple fibers are fully or substantially fully quenched when deposited to form a nonwoven web. Consequently, the resulting nonwoven web needs to be bonded in a separate bonding step. Suitable bonding processes include compression bonding processes, e.g., calender bonding, point bonding and pattern bonding processes; and noncompression bonding processes, e.g., oven bonding, infrared bonding and through-air bonding processes. Typically, compression bonding processes apply a combination of heat and pressure to effect interfiber bonds, e.g., by passing a nonwoven web through the nip formed by a heated smooth or patterned roll and a smooth anvil roll. Noncompression bonding processes elevate the temperature of the nonwoven web until at least one component of the conjugate fibers forming the nonwoven web is melted and rendered adhesive, forming autogenous interfiber bonds at crossover contact points of the fibers.

According to another embodiment of the present invention, the nonwoven webs of the present invention may be laminated to form a composite material. For example, a spunbond conjugate fiber web and a meltblown fiber web of the present invention can be overlaid or sequentially formed and then thermally or adhesively bonded to form a composite fabric that has the strength properties of the spunbond web and the barrier properties of the meltblown web. An exemplary process for producing such composite materials is disclosed in U.S. Pat. No. 4,041,203 to Brock et al., which is herein incorporated by reference.

According to yet another embodiment of the present invention, the nonwoven webs of the present invention may be laminated to a conventional monocomponent fiber nonwoven web or a film. For example, a conjugate fiber web of the present invention may be laminated to a polymeric film and then thermally point bonded to form a high strength, cloth-like liquid barrier laminate. Such barrier laminate is highly useful as, e.g., a fabric for protective garments and a outer cover materials for diapers and other personal care articles.

As stated above, the polyamide/polyolefin conjugate fiber nonwoven web of the present invention exhibits advantageous properties including improved tensile strength, dyeability, chemical functionalities and wettability. The nonwoven web is highly suitable for producing protective garments, e.g., medical examination gowns and surgical gowns; protective covers, e.g., car covers and boat covers; disposable articles, e.g., liners for diapers; and the like.

The present invention is further illustrated with reference to the following examples. However, the examples are not to be construed as limiting the invention thereto.

EXAMPLES

Example 1

A 1 ounce per square yard (osy), 34 g/m², spunbond nonwoven web was prepared from side-by-side 50 wt % polypropylene/50 wt % polycaprolactam conjugate fibers. The polypropylene used was Exxon's PD3445, which had a melt flow rate of 35 g/10 min, and the polycaprolactam (nylon 6) used was a wire jacket grade, 401-D, which had a formic acid relative viscosity of 1.97, a number average molecular weight of about 13,800 and a melt flow rate of 85 g/10 min. The formic acid relative viscosity was tested in accordance with ASTM D789-66, and the melt flow rate was tested in accordance with ASTM D1238-90b, Condition 230/2.16. The nylon 6 resins were obtained from Custom Resins, Henderson, Ky, a division of Bemis Company, Inc. The polypropylene was blended with 2 wt % of a $TiO_2$ concentrate containing 50 wt % of $TiO_2$ and 50 wt % of a polypropylene, and the mixture was fed into a first single screw extruder that had three zones. The nylon 6 was blended with 2 wt % of a $TiO_2$ concentrate containing 25 wt % of $TiO_2$ and 75 wt % of nylon 6, and the mixture was fed into a second single screw extruder that had four zones. The extruded polymers were fed to a bicomponent spinning die through heated transferring tubes and spun into round bicomponent fibers. The bicomponent spinning die had a 0.6 mm spinhole diameter and a 4:1 L/D ratio. The spinhole throughput rate was 0.7 gram/hole/minute. The spinning die was maintained at one constant temperature and, thus, both of the melted component compositions were exposed to the temperature. The processing temperature setting profile of the extruders, transferring tubes and spinneret is shown in Table 1. The bicomponent fibers exiting the spinning die were quenched by a flow of air having a flow rate of 45 SCFM/inch spinneret width and a temperature of 65° F. The quenching air was applied about 5 inches below the spinneret, and the quenched fibers were drawn in an aspirating unit of the type which is described in U.S. Pat. U.S. No. 3,802,817 to Matsuki et al. The quenched fibers were drawn with ambient air in the aspirating unit to attain 2.5 denier fibers. Then, the drawn fibers were deposited onto a foraminous forming surface with the assist of a vacuum flow to form a nonwoven fiber web.

The nonwoven web was point bonded by feeding the web into the nip of a steel calender roll and a steel anvil roll. The calender roll had about 310 raised square bonding points per square inch (48 points/cm²). The bonding rolls were heated to about 143° C. and applied a nip pressure of about 15.5 kg/lineal cm.

TABLE 1

| Position | Temperature Setting (°C.) | |
|---|---|---|
| | Nylon 6 | Polypropylene |
| Extruder | | |
| Zone 1 | 216 | 166 |
| Zone 2 | 241 | 199 |
| Zone 3 | 224 | 221 |
| Zone 4 | 229 | — |
| Zone 5 | 230 | — |
| Transferring Tube | 229 | 221 |
| Spinneret | 232 | |

Example 2

(Ex2)
Example 1 was repeated, except a different processing temperature profile was used, as indicated in Table 2.

TABLE 2

| Position | Temperature Setting (°C.) | |
|---|---|---|
| | Nylon 6 | Polypropylene |
| Extruder | | |
| Zone 1 | 216 | 171 |
| Zone 2 | 241 | 222 |
| Zone 3 | 224 | 229 |
| Zone 4 | 229 | — |
| Zone 5 | 230 | — |
| Transferring Tube | 229 | 229 |
| Spinneret | 234 | |

The point bonded nonwoven webs of Examples 1 and 2 that contain the low molecular weight polyamide, which was melt-processed at a unconventionally low temperature and had a melt temperature that is near or at the melt temperature of the polyolefin component, had uniform fiber coverage and caliper that are similar to conventional monocomponent fiber nonwoven fiber webs.

Comparative Example 1

(C1)
A 1 ounce polypropylene monocomponent spunbond web was prepared using PD3445 polypropylene in accordance with the procedure outlined in Example 1, except polypropylene was melt-processed in both of the extruders and a concentric sheath-core spinning pack was used. The processing temperature profile was as indicated in Table 3.

The resulting nonwoven web was tested for its grab tensile strength and tear strength. The grab tensile strength was tested in accordance with Federal Standard Methods 191A, Method 5100 (1978), and the tear strength was tested in accordance with the Trapezoidal Tear Test as described in ASTM D1117-80, Method 14. The results are shown in Table 12.

TABLE 3

| Position | Temperature Setting (°C.) | |
|---|---|---|
| | Extruder 1 | Extruder 2 |
| Extruder | | |
| Zone 1 | 171 | 171 |
| Zone 2 | 199 | 198 |
| Zone 3 | 220 | 221 |
| Zone 4 | 222 | — |
| Zone 5 | 222 | — |
| Transferring Tube | 230 | 230 |
| Spinneret | 229 | |

Comparative Example 2

(C2)
A nylon 6/polypropylene bicomponent conjugate fiber web was produced from a fiber grade polyamide, Nylon 6 Spinning Chips, available from DSM, and Exxon PD3445 polypropylene in accordance with the procedure outlined in Example 1 and the processing temperature profile shown in Table 4. The nylon 6 had a formic acid relative viscosity of 2.45 and a number average molecular weight of about 19,700. The elevated processing temperature profile of the polyamide was selected in accordance with the processing recommendation and guideline of the polyamide manufacturer.

TABLE 4

| Position | Temperature Setting (°C.) | |
|---|---|---|
| | Nylon 6 | Polypropylene |
| Extruder | | |
| Zone 1 | 219 | 171 |
| Zone 2 | 266 | 199 |
| Zone 3 | 263 | 221 |
| Zone 4 | 263 | — |
| Zone 5 | 263 | — |
| Transferring Tube | 263 | 221 |
| Spinneret | 262 | |

The fiber grade nylon 6 could not properly be spun into conjugate fibers. The polymer strands exiting the spinneret were significantly bent, and the strands randomly fused and roped during the drawing process. A nonwoven fabric was not prepared since the roped fibers would not make a useful nonwoven fabric.

Comparative Example 3

(C3)
Comparative Example 2 was repeated except the melt processing temperature of nylon 6 was raised in order to decrease the melt viscosity of the polymer composition. The processing temperature profile was as indicated in Table 5.

TABLE 5

| Position | Temperature Setting (°C.) | |
|---|---|---|
| | Nylon 6 | Polypropylene |
| Extruder | | |
| Zone 1 | 221 | 171 |
| Zone 2 | 268 | 199 |
| Zone 3 | 291 | 221 |
| Zone 4 | 288 | — |
| Zone 5 | 288 | — |
| Transferring Tube | 287 | 221 |
| Spinneret | 265 | |

Raising the melt temperature of the nylon composition, in order to affect the melt viscosity of the polymer, did not alleviate the fusing and roping problem. The filaments were fused and roped.

Comparative Example 4

(C4)
Comparative Example 3 was repeated except the processing temperature of the nylon composition was further raised in order to further reduce the melt viscosity of the composition. The resulting fibers were formed into a nonwoven fabric in accordance with Example 1. The processing temperature profile was as indicated in Table 6.

TABLE 6

| Position | Temperature Setting (°C.) | |
|---|---|---|
| | Nylon 6 | Polypropylene |
| Extruder | | |
| Zone 1 | 221 | 171 |
| Zone 2 | 291 | 199 |
| Zone 3 | 303 | 215 |
| Zone 4 | 299 | — |
| Zone 5 | 299 | — |
| Transferring Tube | 299 | 215 |
| Spinneret | 264 | |

Again, raising the processing temperature did not cure the fusing and roping phenomena, and in fact the roping problem was more severe. It is believed that not only the melt viscosity difference between the component compositions but also the melt temperature disparity and thus insufficient quenching of the nylon composition further contributed to the roping problem. As expected, the produced nonwoven fabric had a highly nonuniform fiber coverage due to the roped fibers.

Example 3

(Ex3)
Example 1 was repeated except sheath-core conjugate fibers were produced using a concentric sheath-core spinning pack. The processing temperature profile was as shown in Table 7.

TABLE 7

| Position | Temperature Setting (°C.) | |
|---|---|---|
| | Nylon 6 | Polypropylene |
| Extruder | | |
| Zone 1 | 219 | 171 |
| Zone 2 | 239 | 199 |
| Zone 3 | 242 | 221 |
| Zone 4 | 229 | — |
| Zone 5 | 230 | — |
| Transferring Tube | 230 | 221 |
| Spinneret | 229 | |

Figure 7:
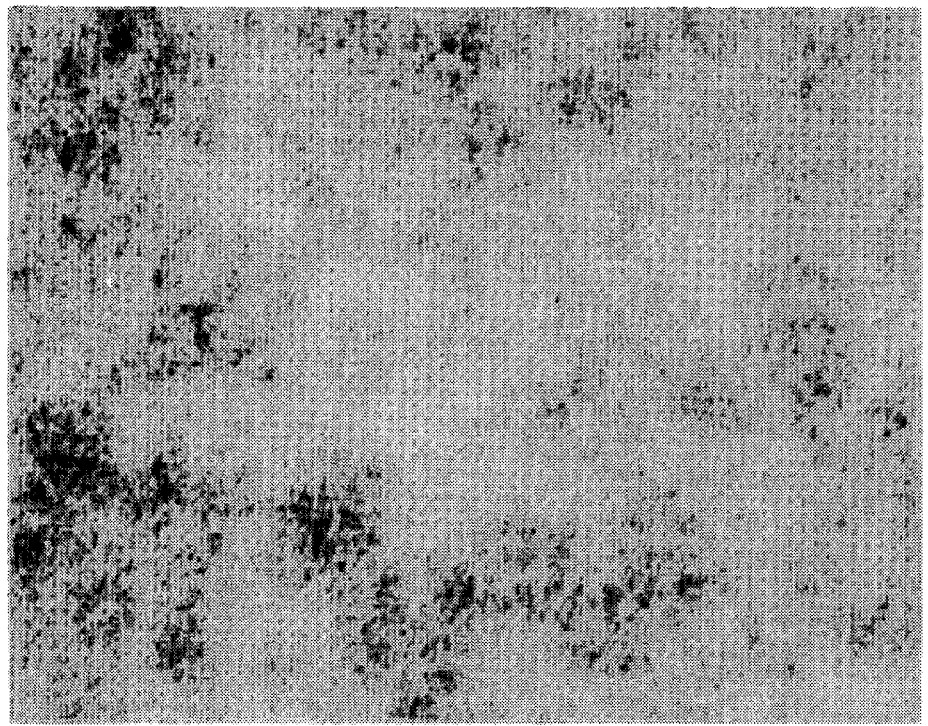
FIG. 7 shows a conjugate fiber nonwoven fabric that was produced in accordance with the present invention.

FIG. 7 is a photograph of the point bonded nonwoven fabric produced from this example. As can be seen from FIG. 7, the nonwoven fabric had a highly uniform fiber coverage.

Comparative Example 5

(C5)
Comparative Example 2 was repeated except sheath-core conjugate fibers were produced using a concentric sheath-core spinning pack. The processing temperature profile was as shown in Table 8.

TABLE 8

| Position | Temperature Setting (°C.) | |
|---|---|---|
| | Nylon 6 | Polypropylene |
| Extruder | | |
| Zone 1 | 218 | 171 |
| Zone 2 | 291 | 199 |
| Zone 3 | 298 | 221 |

TABLE 8-continued

| Position | Temperature Setting (°C.) | |
|---|---|---|
| | Nylon 6 | Polypropylene |
| Zone 4 | 299 | — |
| Zone 5 | 298 | — |
| Transferring Tube | 299 | 221 |
| Spinneret | 238 | |

Figure 8:
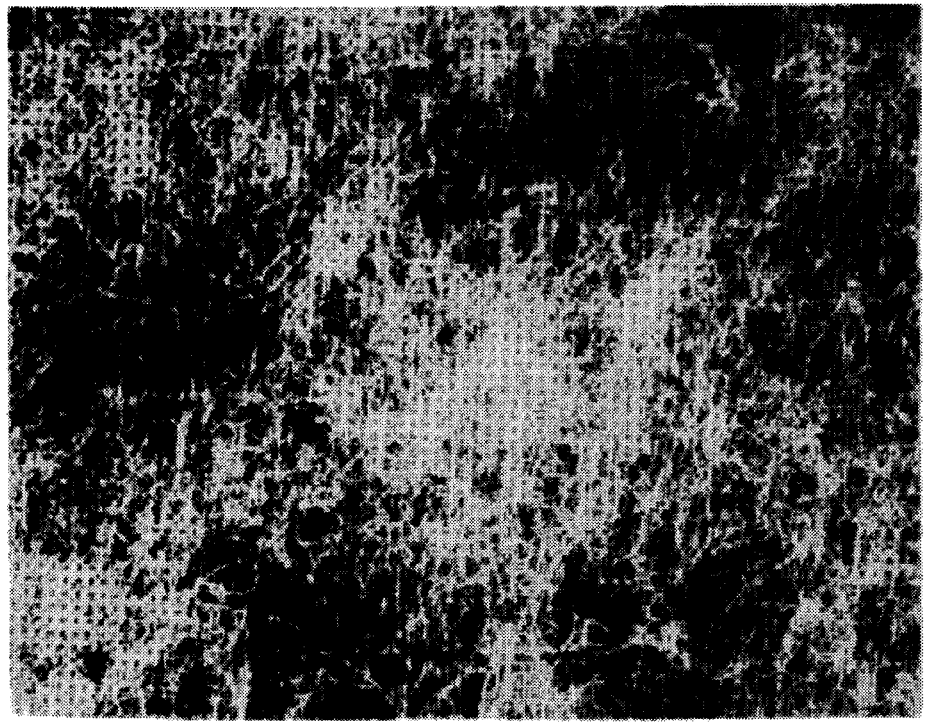
FIG. 8 shows a nonwoven fabric that was produced with a conventional polycaprolactam.

The resulting conjugate fibers fused and roped during the drawing process. The high molecular weight of the polyamide caused the spinning problem even though the processing temperature of the polyamide component was significantly raised to influence the melt flow properties of the component. FIG. 8 is a photograph of the nonwoven fabric. The photograph clear shows the fused and roped fibers and uneven coverage of the fibers forming the nonwoven fabric.

Example 4

(Ex4)

Example 3 was repeated and the processing temperature profile was as shown in Table 9. Three nonwoven fabrics having conjugate fibers of different polymer component proportions were produced. The polymer component proportions were 50:50, 40:60 and 60:40 by weight of nylon 6 and polypropylene.

TABLE 9

| Position | Temperature Setting (°C.) | |
|---|---|---|
| | Nylon 6 | Polypropylene |
| Extruder | | |
| Zone 1 | 171 | 171 |
| Zone 2 | 214 | 198 |
| Zone 3 | 239 | 221 |
| Zone 4 | 229 | — |
| Zone 5 | 230 | — |
| Transferring Tube | 229 | 229 |
| Spinneret | 229 | |

Figure 9:
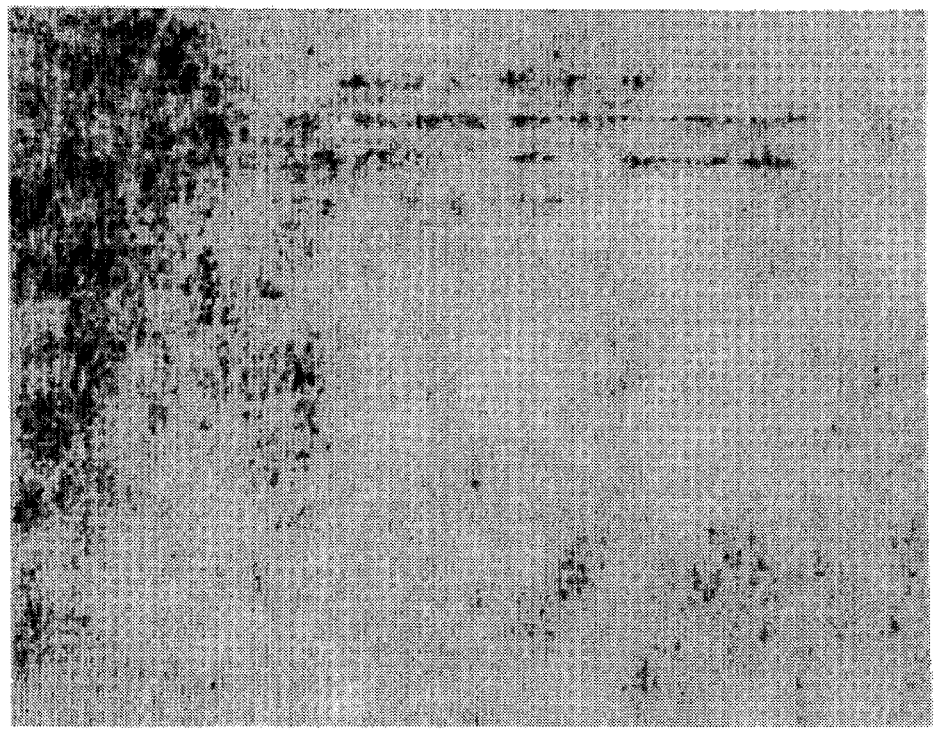
FIG. 9 shows another conjugate fiber nonwoven fabric that was produced in accordance with the present invention.

All of the three component polymer proportions resulted in uniformly extruded and drawn conjugate fibers and, correspondingly, nonwoven fabrics having a uniform fiber coverage and even caliper. FIG. 9 is a photograph of the nonwoven fabric which was produced from conjugate fibers having 50:50 nylon 6 and polypropylene components. The photograph shows isotropically and uniformly laid fibers of the nonwoven fabric.

The fabric shown in FIG. 9 was also tested for its grab and tear strength properties in accordance with the procedures outlined in Comparative Example 1. The results are shown in Table 12.

Comparative Example 6

(C6)

Comparative Example 5 was repeated except a different fiber grade nylon 6 was used. Nylon 6 used was a low molecular weight fiber grade polycaprolactam, DSM 1130, which had a formic acid relative viscosity of 2.22, a number average molecular weight of about 16,700 and a melt flow rate of 42 g/10 min. The processing temperature profile was as shown in Table 10. The resulting fabric was tested for its grab and tear strength properties in accordance with the procedures outlined in Comparative Example 1. The results are shown in Table 12.

TABLE 10

| Position | Temperature Setting (°C.) | |
|---|---|---|
| | Nylon 6 | Polypropylene |
| Extruder | | |
| Zone 1 | 171 | 171 |
| Zone 2 | 214 | 198 |
| Zone 3 | 241 | 221 |
| Zone 4 | 229 | — |
| Zone 5 | 230 | — |
| Transferring Tube | 229 | 229 |
| Spinneret | 229 | |

During the filament spinning process, spin breaks were observed, and the extruded fibers of Comparative Example 6 fused and roped during the drawing process. Although the conjugate fibers of Example 4 and Comparative Example 6 were prepared under virtually the same processing condition, only the polyamide having the low molecular weight (of Example 4) was properly spun into conjugate fibers. The comparison of the results of Example 4 and Comparative Example 6 clearly demonstrates that the low molecular weight polycaprolactam is uniquely suited for forming conjugate fibers in conjunction with polyolefins that are typically used to produced nonwoven fabrics.

Figure 10:
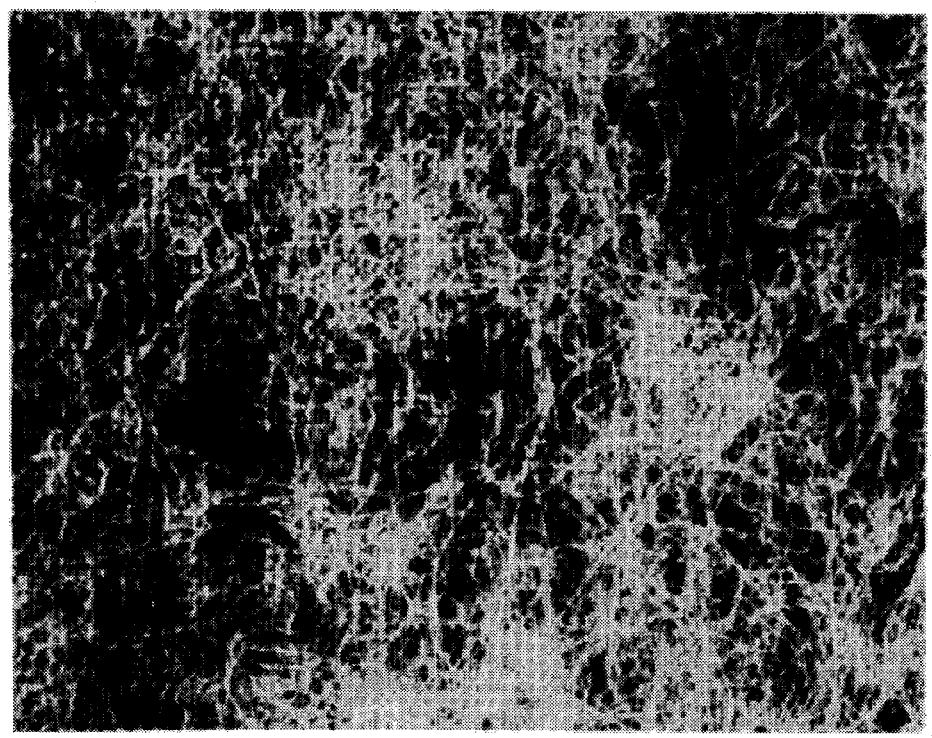
FIG. 10 shows another nonwoven fabric that was produced with a conventional polycaprolactam.

FIG. 10 show the nonwoven fabric produced in this comparative example. Fused and roped fibers are clearly visible, and as expected, the fiber coverage is highly inadequate, forming many sections of no fiber coverage.

Example 5

(Ex5)

Example 3 was repeated except linear low density polyethylene (LLDPE) was used in place of polypropylene. The linear low density polyethylene, 6811A grade, is commercially available from Dow Chemical. The LLDPE had a melt flow rate of about 43 g/ 10 min, as measured in accordance with ASTM D1238-90b, Condition 230/2.16. In addition, the nonwoven fabric was bonded with a bonding roll having a different bond pattern. The bonding roll had bond points that covered about 25% of the total surface area and had a bond point density of about 200 regularly spaced points per square inch (31 points/cm$^2$). The processing temperature profile was as shown in Table 11, and the resulting fabric was tested for its grab and tear strength properties in accordance with the procedures outlined in Comparative Example 1. The results are shown in Table 12.

TABLE 11

| Position | Temperature Setting (°C.) | |
|---|---|---|
| | Nylon 6 | LLDPE |
| Extruder | | |
| Zone 1 | 172 | 166 |
| Zone 2 | 216 | 194 |
| Zone 3 | 238 | 221 |
| Zone 4 | 231 | — |
| Zone 5 | 230 | — |
| Transferring Tube | 229 | 229 |
| Spinneret | 229 | |

TABLE 12

| Example | Tensile Strength (Kg) MD | Tensile Strength (Kg) CD | Tear Strength (Kg) MD | Tear Strength (Kg) CD |
|---|---|---|---|---|
| Ex 4 | 15.1 | 11.5 | 3.5 | 3.2 |
| Ex 5 | 14.2 | 7.2 | 5.7 | 2.6 |
| C1 | 2.5 | 2.4 | 1.9 | 1.5 |
| C6 | 5.4 | 2.5 | 1.8 | 1.5 |

MD = machine direction
CD = cross-machine direction

The above strength data clearly demonstrate that the conjugate fiber webs of the present invention have superior strength properties, such as tensile and tear strength properties, over monocomponent nonwoven fiber webs and conjugate fiber webs produced from a conventional fiber-grade polycaprolactam.

Example 6

(Ex6)

Example 3 was repeated except that the nylon 6 used was Capron® 1767. Capron® 1767 was obtained from Allied-Signal Inc., and it had a formic acid relative viscosity of 2.1, a number average molecular weight of about 16,100 and a melt flow rate of 49 g/10 min. The processing temperature profile was as shown in Table 13.

TABLE 13

| Position | Temperature Setting (°C.) Nylon 6 | Temperature Setting (°C.) Polypropylene |
|---|---|---|
| Extruder | | |
| Zone 1 | 171 | 171 |
| Zone 2 | 218 | 199 |
| Zone 3 | 241 | 229 |
| Zone 4 | 229 | — |
| Zone 5 | 229 | — |
| Transferring Tube | 229 | 229 |
| Spinneret | 231 | |

Conjugate fibers were produced and a point bonded nonwoven was prepared, although there was a minor amount of roping observed.

Example 7

(Ex7)

Example 6 was repeated, except the polyamide was modified to contain sodium stearate and 6811A LLDPE was used in place of polypropylene. The stearate was topically dusted on the polyamide pellets, and it is believed that the amount of sodium stearate applied was less than 1 wt % of the pellets. In addition, a wedge spinning pack was used, and the bond pattern of Example 5 was utilized. The wedge spinning pack contained 16 identically shaped wedges, similar to FIG. 5, and the two polymer components were arranged to alternatingly occupy the wedges. The processing temperature profile was as shown in Table 14.

TABLE 14

| Position | Temperature Setting (°C.) Nylon 6 | Temperature Setting (°C.) LLDPE |
|---|---|---|
| Extruder | | |
| Zone 1 | 240 | 205 |
| Zone 2 | 239 | 210 |
| Zone 3 | 238 | 229 |
| Zone 4 | 237 | — |
| Zone 5 | 237 | — |
| Transferring Tube | 238 | 229 |
| Spinneret | 239 | |

A point bonded nonwoven fabric was produced, and it was observed that the addition of the lubricant, sodium stearate, improved the processibility of the polyamide.

Example 8

(Ex8)

A through-air bonded nonwoven fabric of nylon 6/LLDPE wedge conjugate fibers, which had the conjugate fiber configuration described in Example 7, was produced. The nylon 6 used was custom polymerized polycaprolactam, which was produced by Nyltech, NH, and had a formic acid relative viscosity of 1.85, a number average molecular weight of about 12,500 and a melt flow rate of 94 g/10 min. The LLDPE used was 6811A LLDPE. Conjugate fibers were produced and deposited to form an unbonded nonwoven web in accordance with Example 7. The processing temperature profile was as shown in Table 15.

The unbonded nonwoven web was bonded by passing the web through a through-air bonder which was equipped with a heated air source. The through-air bonder is described in further detail in the above-mentioned U.S. Pat. No. 5,382,400. The heated air velocity and the temperature of the heated air were 200 feet/minute (61 m/min) and 133° C., respectively. The residence time of the web in the hood was about 1 second. The resulting bonded web had a thickness of about 0.9 mm and a basis weight of about 85 g/m$^2$.

TABLE 15

| Position | Temperature Setting (°C.) Nylon 6 | Temperature Setting (°C.) Polypropylene |
|---|---|---|
| Extruder | | |
| Zone 1 | 221 | 166 |
| Zone 2 | 241 | 203 |
| Zone 3 | 230 | 230 |
| Zone 4 | 228 | — |
| Zone 5 | 230 | — |
| Transferring Tube | 229 | 230 |
| Spinneret | 234 | |

The through-air bonded nonwoven fabric had an excellent uniform fiber coverage and exhibited good flexibility and resiliency.

As can be seen from the examples, the low molecular weight polyamide of the present invention can be melt-processed with polyolefins under melt-processing conditions that are typically utilized to process polyolefins, especially to produce polyolefin nonwoven fabrics. This is highly unexpected since the melting points and melt-processing temperature of conventional polyamides are significantly higher than those of polyolefins.

The polyolefin/polycaprolactam conjugate fibers and nonwoven webs produced therefrom exhibit a combination of highly desirable properties, including tensile strength, tear strength, abrasion resistance, broader bonding temperature range, dyeability and hydrophilicity over polyolefin fibers and nonwoven webs.

What is claimed is:

1. A conjugate fiber comprising a polyolefin and a polyamide selected from polycaprolactam, copolymers of caprolactam and hexamethylene adipamide, hydrophilic copolymers of caprolactam and ethylene oxide diamine, and blends thereof, wherein said polyamide has a number average molecular weight up to about 16,500.

2. The conjugate fiber of claim 1 wherein said polyamide is a polycaprolactam.

3. The conjugate fiber of claim 1 having a configuration selected from side-by-side, concentric sheath-core, eccentric sheath-core, wedge, wedge-core and islands-in-sea configurations.

4. The conjugate fiber of claim 3 having a hollow configuration.

5. The conjugate fiber of claim 1 wherein said polyamide has a number average molecular weight between about 10,000 and about 16,200.

6. The conjugate fiber of claim 1 is a spunbond fiber.

7. The conjugate fiber of claim 1 is a meltblown fiber.

8. The conjugate fiber of claim 1 wherein said polyolefin is selected from polyethylene, polypropylene, polybutylene, polypentene, polyvinyl acetate, polyvinyl chloride, polystyrene, and copolymers and blends thereof.

9. The conjugate fiber of claim 8 wherein said polyolefin is selected from high density polyethylene, linear low density polyethylene, isotactic polypropylene, blends of isotactic polypropylene and atactic polypropylene, syndiotactic polypropylene, and blends thereof.

10. A nonwoven fabric comprising conjugate fibers, said conjugate fibers comprising a polyolefin and a polyamide selected from polycaprolactam, copolymers of caprolactam and hexamethylene adipamide, hydrophilic copolymers of caprolactam and ethylene oxide diamine, and blends thereof, wherein said polyamide has a number average molecular weight up to about 16,500.

11. The nonwoven fabric of claim 10 wherein said polyamide is a polycaprolactam.

12. The nonwoven fabric of claim 10 wherein said polyolefin is selected from polyethylene, polypropylene, polybutylene, polypentene, polyvinyl acetate, polyvinyl chloride, polystyrene, and copolymers and blends thereof.

13. The nonwoven fabric of claim 10 wherein said conjugate fibers have a configuration selected from side-by-side, concentric sheath-core, eccentric sheath-core, wedge, wedge-core and islands-in-sea configurations.

14. The nonwoven fabric of claim 10 wherein said polyamide has a number average molecular weight between about 10,000 and about 16,200.

15. The nonwoven fabric of claim 10 wherein said conjugate fibers are spunbond fibers.

16. The nonwoven fabric of claim 10 wherein said conjugate fibers are meltblown fibers.

17. A laminate comprising the nonwoven fabric of claim 10 and a film.

18. A laminate comprising the nonwoven fabric of claim 10 and an additional nonwoven fabric.

19. The conjugate fiber of claim 2 wherein said polycaprolactam has a number average molecular weight between about 11,500 and about 15,000.

20. The nonwoven fabric of claim 11 wherein said polycaprolactam has a number average molecular weight between about 11,500 and about 15,000.

21. The conjugate fiber of claim 19 wherein said conjugate fiber is a spunbond fiber and said polyolefin is selected from high density polyethylene, linear low density polyethylene, isotactic polypropylene, blends of isotactic polypropylene and atactic polypropylene, syndiotactic propylene, and blends thereof.

22. The nonwoven fabric of claim 20 wherein said conjugate fibers are spunbond fibers and said polyolefin is selected from high density polyethylene, linear low density polyethylene, isotactic polypropylene, blends of isotactic polypropylene and atactic polypropylene, syndiotactic propylene, and blends thereof.

* * * * *